(12) United States Patent
Conner et al.

(10) Patent No.: US 7,697,459 B2
(45) Date of Patent: Apr. 13, 2010

(54) METHODS AND APPARATUS FOR IDENTIFYING A DISTANCE-VECTOR ROUTE ASSOCIATED WITH A WIRELESS MESH NETWORK

(75) Inventors: W. Steven Conner, Hillsboro, OR (US); Mark D. Yarvis, Portland, OR (US); Anand Rangarajan, Hillsboro, OR (US); Hakirat Singh, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 909 days.

(21) Appl. No.: 11/030,016

(22) Filed: Jan. 5, 2005

(65) Prior Publication Data

US 2006/0146717 A1 Jul. 6, 2006

(51) Int. Cl.
*H04L 12/28* (2006.01)
(52) U.S. Cl. .................. 370/255; 370/400; 370/432; 370/437
(58) Field of Classification Search .................. 370/235, 370/236, 238, 230, 231, 254, 255, 351, 400, 370/431, 432, 312, 322, 348, 406, 419, 420, 370/437
See application file for complete search history.

(56) References Cited

U.S. PATENT DOCUMENTS

| | | | | |
|---|---|---|---|---|
| 6,016,306 A | * | 1/2000 | Le Boudec et al. | 370/235 |
| 7,269,657 B1 | * | 9/2007 | Alexander et al. | 709/229 |
| 7,376,121 B2 | * | 5/2008 | Dunagan et al. | 370/351 |
| 2003/0161268 A1 | | 8/2003 | Larsson et al. | |
| 2003/0202476 A1 | * | 10/2003 | Billhartz et al. | 370/236 |
| 2004/0090924 A1 | * | 5/2004 | Giaimo et al. | 370/252 |
| 2004/0240442 A1 | * | 12/2004 | Grimminger et al. | 370/389 |
| 2004/0264379 A1 | | 12/2004 | Srikrishna et al. | |
| 2005/0007949 A1 | * | 1/2005 | Okura | 370/217 |
| 2005/0053005 A1 | * | 3/2005 | Cain et al. | 370/235 |
| 2006/0062150 A1 | * | 3/2006 | Felter et al. | 370/235 |

FOREIGN PATENT DOCUMENTS

| | | |
|---|---|---|
| EP | 1 376 939 A2 | 1/2004 |
| WO | WO2004/014091 A1 | 2/2004 |
| WO | WO 2004/114690 A1 | 12/2004 |

OTHER PUBLICATIONS

Baker, et al. "The Architectural Organization of a Mobile Radio Network via a Distributed Algorithm", IEEE Trans. on Comm's, vol. Com-29, No. 11, Nov. 1981, pp. 1694-1701.

Yarvis, et al. "Real-World Experiences with an Interactive Ad Hoc Sensor Network", 2002 IEEE; Proc. of the Int'l. Conf. on Parallel Processing Workshops, whole document.

De Couto, et al. "A High-Throughput Path Metric for Multi-Hop Wireless Routing", MobiCom '03, Sep. 14-19, 2003, San Diego, CA, whole document.

(Continued)

*Primary Examiner*—Ricky Ngo
*Assistant Examiner*—Wei-Po Kao
(74) *Attorney, Agent, or Firm*—Schwabe, Williamson & Wyatt, P.C.

(57) ABSTRACT

Embodiments of methods and apparatus for identifying a distance-vector route associated with a wireless mesh network are generally described herein. Other embodiments may be described and claimed.

31 Claims, 6 Drawing Sheets

OTHER PUBLICATIONS

Connor, et al., "Experimental Evaluation of Synchronization and Topology Control for In-Building Sensor Network Appls", WSNA '03, Sep. 19, 2003, San Diego, CA, pp. 38-49.

Clausen, et al. "Optimized Link State Routing Protocol (OLSR)", http://hipercom.inria.fr/olsr/rfc3626.txt, Oct. 2003, 71 pgs.

Draves, et al. "Routing in Multi-Radio, Multi-Hop Wireless Mesh Networks", MobiCom '04, Sep. 26-Oct. 1, 2004, Philadelphia, PA, whole document.

Connor, et al. "Methods and Apparatus for Distributing Link-State Information Associated With a Wireless Mesh Network", U.S. Appl. No. 11/025,612, filed Dec. 29, 2004.

Conner, et al, "Multichannel Mesh Network, Multichannel Mesh Router and Methods for Routing Using Bottleneck Channel . . . ", U.S. Appl. No. 11/030,592, filed Jan. 4, 2005.

Yarvis, et al, "Multichannel Mesh Router and Methods for Path Selection in a Multichannel Mesh Network", U.S. Appl. No. 11/030,593, filed Jan. 4, 2005.

Yarvis, et al, "Methods and Apparatus for Providing a Transparent Bridge Associated With a Wireless Mesh Network", U.S. Appl. No. 11/030,532, filed Jan. 5, 2005.

PCT/US2006/000752, Intl. Search Report, Jun. 7, 2006.

* cited by examiner

700 →

| Bottleneck Channel | Channel Used | Next Hop | $X_1$ | $X_2$ | $X_3$ | ... | $X_k$ |
|---|---|---|---|---|---|---|---|
| Channel 1 | 2 | 203 | 1 | 1 | | ... | |
| Channel 2 | 1 | 202 | 2 | 0 | | ... | |
| Channel 3 | | | | | | ... | |
| ... | ... | ... | ... | ... | ... | ... | ... |
| Channel k | | | | | | ... | |

710 — Channel 1 row
720 — Channel 2 row

| Source | Destination | Next Hop |
|---|---|---|
| 201 | 206 | 205 |
| 204 | 201 | 203 |
| 206 | 201 | 202 |

810 — first row
820 — second row
830 — third row

FIG. 8

METHODS AND APPARATUS FOR IDENTIFYING A DISTANCE-VECTOR ROUTE ASSOCIATED WITH A WIRELESS MESH NETWORK

TECHNICAL FIELD

The present disclosure relates generally to wireless communication systems, and more particularly, to methods and apparatus for identifying a distance-vector route associated with a wireless mesh network.

BACKGROUND

To provide greater flexibility and to improve system performance of a wireless mesh network, a mesh node of the wireless mesh network may include two or more communication interfaces (e.g., multiple radios). In particular, a mesh node may use a first communication interface to communicate on a first communication channel and use a second communication interface to communicate on a second communication channel. For example, the mesh node may receive data packets with the first communication interface on the first channel and transmit data packets with the second communication interface on the second channel at the same time. Thus, multiple communication channels may allow one or more links of the wireless mesh network to be active because the links may use different, non-interfering communication channels even if two or more links may be within an interference range of each other.

BRIEF DESCRIPTION OF THE DRAWINGS

FIG. 7 depicts an example route request table that may be used to implement the example wireless communication system of FIG. 2.

FIG. 8 depicts an example routing table that may be used to implement the example wireless communication system of FIG. 2.

DETAILED DESCRIPTION

In general, methods and apparatus for identifying a distance-vector route associated with a wireless mesh network are described herein. According to one example embodiment, a first mesh node having a plurality of communication interfaces may generate a matrix of metric information associated with a plurality of communication channels. The first mesh node may be one of a plurality of mesh nodes associated with a wireless mesh network. The first mesh node may provide route request information based on the matrix to a second mesh node of the plurality of mesh nodes. The methods and apparatus described herein are not limited in this regard.

Figure 1:
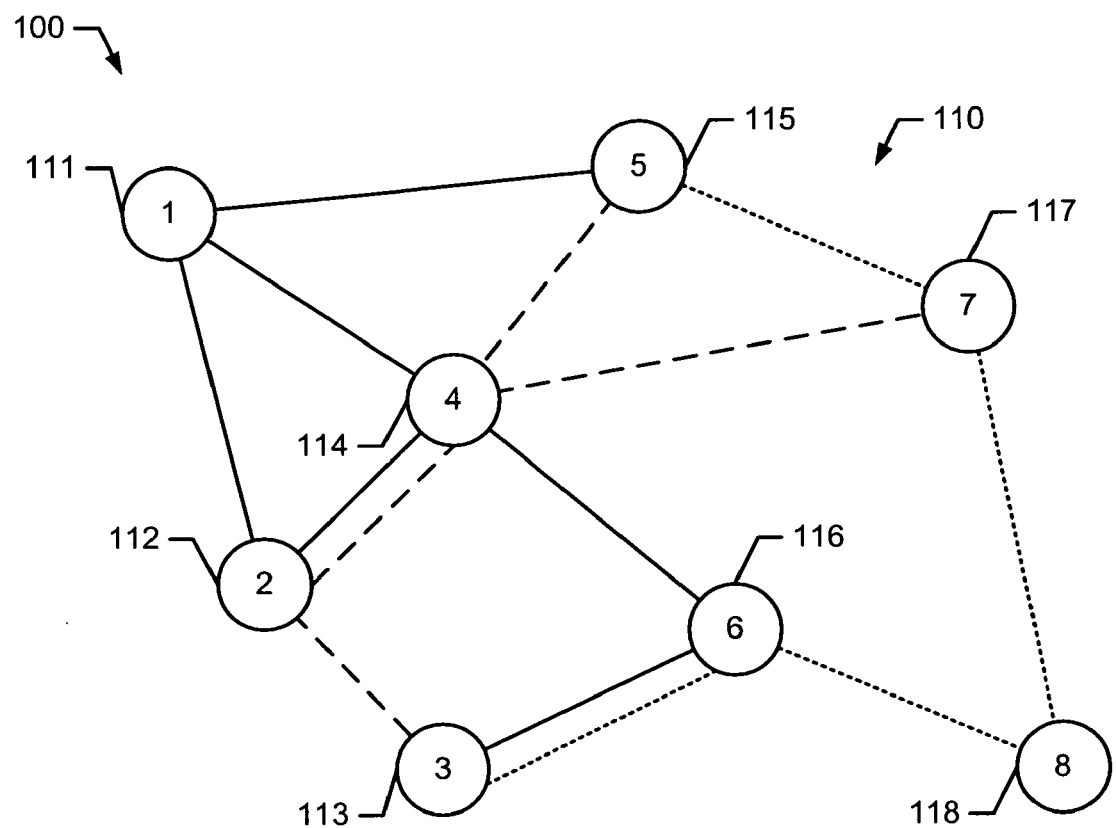
FIG. 1 is a schematic diagram representation of an example wireless communication system according to an embodiment of the methods and apparatus disclosed herein.

Referring to FIG. 1, an example wireless mesh network 100 including a plurality of mesh nodes 110, generally shown as 111, 112, 113, 114, 115, 116, 117, and 118, is described herein. Although FIG. 1 depicts eight mesh nodes, the wireless mesh network 100 may include additional or fewer mesh nodes. As described in detail below, the plurality of nodes 110 may include access points, redistribution points, end points, and/or other suitable connection points for traffic flows via mesh routes having multiple hops.

The plurality of nodes 110 may operate in accordance with one or more of several wireless communication protocols to communicate with each other and/or other wireless devices (e.g., a laptop computer, a handheld computer, a tablet computer, a cellular telephone a wireless peripheral, etc.). In particular, these wireless communication protocols may be based on analog, digital, and/or dual-mode communication system standards such as the Global System for Mobile Communications (GSM) standard, the Frequency Division Multiple Access (FDMA) standard, the Time Division Multiple Access (TDMA) standard, the Code Division Multiple Access (CDMA) standard, the Wideband CDMA (WCDMA) standard, the General Packet Radio Services (GPRS) standard, the Enhanced Data GSM Environment (EDGE) standard, the Universal Mobile Telecommunications System (UMTS) standard, variations and evolutions of these standards, and/or other suitable wireless communication standards.

The plurality of nodes 110 may use a variety of modulation techniques such as spread spectrum modulation (e.g., direct sequence code division multiple access (DS-CDMA) and/or frequency hopping code division multiple access (FH-CDMA)), time-division multiplexing (TDM) modulation, frequency-division multiplexing (FDM) modulation, orthogonal frequency-division multiplexing (OFDM) modulation, multi-carrier modulation (MDM), and/or other suitable modulation techniques to communicate with each other. In particular, the plurality of nodes 110 may use OFDM modulation as described in the 802.xx family of standards developed by the Institute of Electrical and Electronic Engineers (IEEE) and/or variations and evolutions of these standards (e.g., 802.11x, 802.15, 802.16x, etc.) to communicate via the wireless communication links with each other. The plurality of nodes 110 may also operate in accordance with other suitable wireless communication protocols that require very low power such as Bluetooth, Ultra Wideband (UWB), and/or radio frequency identification (RFID) to communicate with each other.

Based on the wireless communication protocols mentioned above, the plurality of mesh nodes 110 may communicate with each other via one or more communication channels. In one example, the mesh node 114 may communicate with the mesh nodes 115 and 117 on a first communication channel (e.g., indicated by a dash line). Also, the mesh node 114 may communicate with the mesh nodes 111 and the 112 on a second communication channel (e.g., indicated by a solid line). Further, the mesh node 114 may communicate with the mesh node 112 on both the first and second communication channels. In another example, the mesh node 116 may communicate with the mesh nodes 113 and 118 on a third communication channel (e.g., indicated by a dotted line). The mesh node 116 may also communicate with the mesh node 113 on the second communication channel. Although FIG. 1 depicts three communication channels, the wireless mesh network 100 may include additional or fewer communication channels.

The plurality of mesh nodes 110 may also communicate with other components associated with the wireless mesh network 100 such as wireless local area network (WLAN) devices and/or wireless wide area network (WWAN) devices (not shown) including network interface devices and peripherals (e.g., network interface cards (NICs)), access points (APs), gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, and/or any other suitable communication system. The methods and apparatus described herein are not limited in this regard.

Figure 2:
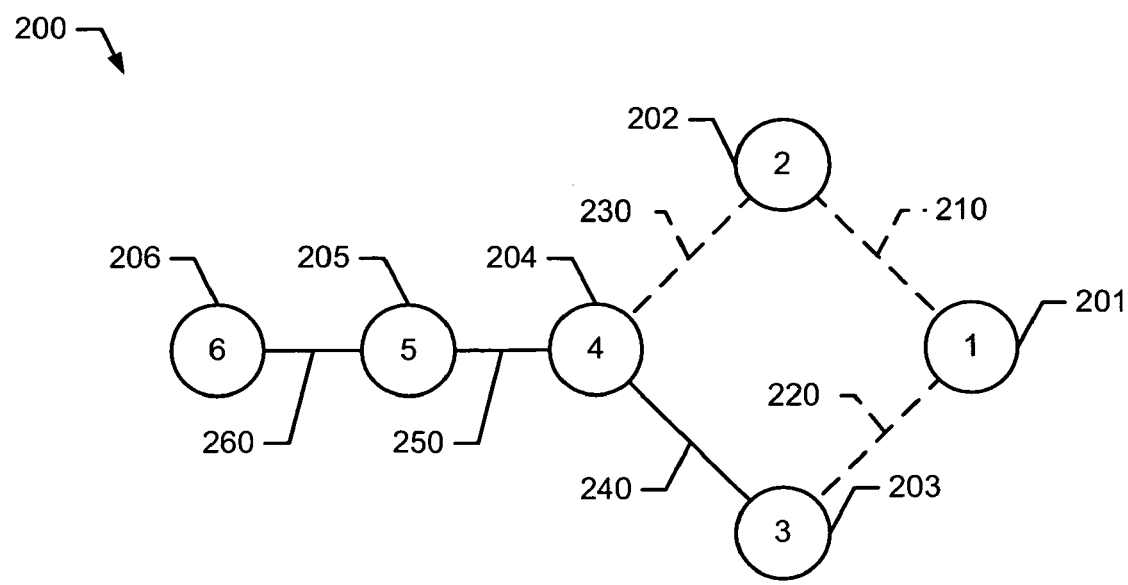
FIG. 2 is a schematic diagram representation of an example wireless communication system according to another embodiment of the methods and apparatus disclosed herein.

In FIG. 2, another example wireless mesh network 200 may include two or more mesh nodes, generally shown as 201, 202, 203, 204, 205, and 206. The mesh nodes of the wireless mesh network 200 may communicate with each other via mesh links operating on two or more communication channels. For example, a mesh link between two of the mesh nodes may operate on either a first communication channel (e.g., Channel 1) as indicated by a dash line or a second communication channel (e.g., Channel 2) as indicated by a solid line. Although FIG. 2 depicts two communication channels, the wireless mesh network 200 may include additional communication channels.

In one example, the mesh node 201 may operate as the source node and the mesh node 206 may operate as the destination node of the wireless mesh network 200. The wireless mesh network 200 may also include one or more intermediate nodes, generally shown as 202, 203, 204, and 205. The source node 201 may communicate with the intermediate node 202 via a link 210 on Channel 1. Further, the source node 201 may communicate with the intermediate node 203 via a link 220 on Channel 1.

The intermediate node 202 may communicate with the intermediate node 204 via a link 230 on Channel 1. The intermediate node 203 may also communicate with the intermediate node 204 but via a link 240 on Channel 2. In turn, the intermediate node 204 may communicate with the intermediate node 205 via a link 250 on Channel 2. The intermediate node 205 may communicate with the destination node 206 via a link 260 on Channel 2.

As a result, a packet of the wireless mesh network 200 from the source node 201 to the destination node 206 may travel along a first path from the source node 201 to the intermediate node 202 via the link 210 on Channel 1, from the intermediate node 202 to the intermediate node 204 via the link 230 on Channel 1, from the intermediate node 204 to the intermediate node 205 via the link 250 on Channel 2, and from the intermediate node 205 to the destination node 206 via the link 260 on Channel 2 or vice versa. Alternatively, a packet of the wireless mesh network 200 from the source node 201 to the destination node 206 may travel along a second path from the source node 201 to the intermediate node 203 via the link 220 on Channel 1, from the intermediate node 203 to the intermediate node 204 via the link 240 on Channel 2, from the intermediate node 204 to the intermediate node 205 via the link 250 on Channel 2, and from the intermediate node 205 to the destination node 206 via the link 260 on Channel 2 or vice versa.

When two or more mesh links of the wireless mesh network 200 operate on the same communication channel, transmissions via the mesh links may interfere with each other and reduce the available bandwidth of the wireless mesh network 200. To minimize the interference between the mesh links that may use the same communication channel, the mesh nodes may diversify the communication channels used in the mesh links.

Figure 3:
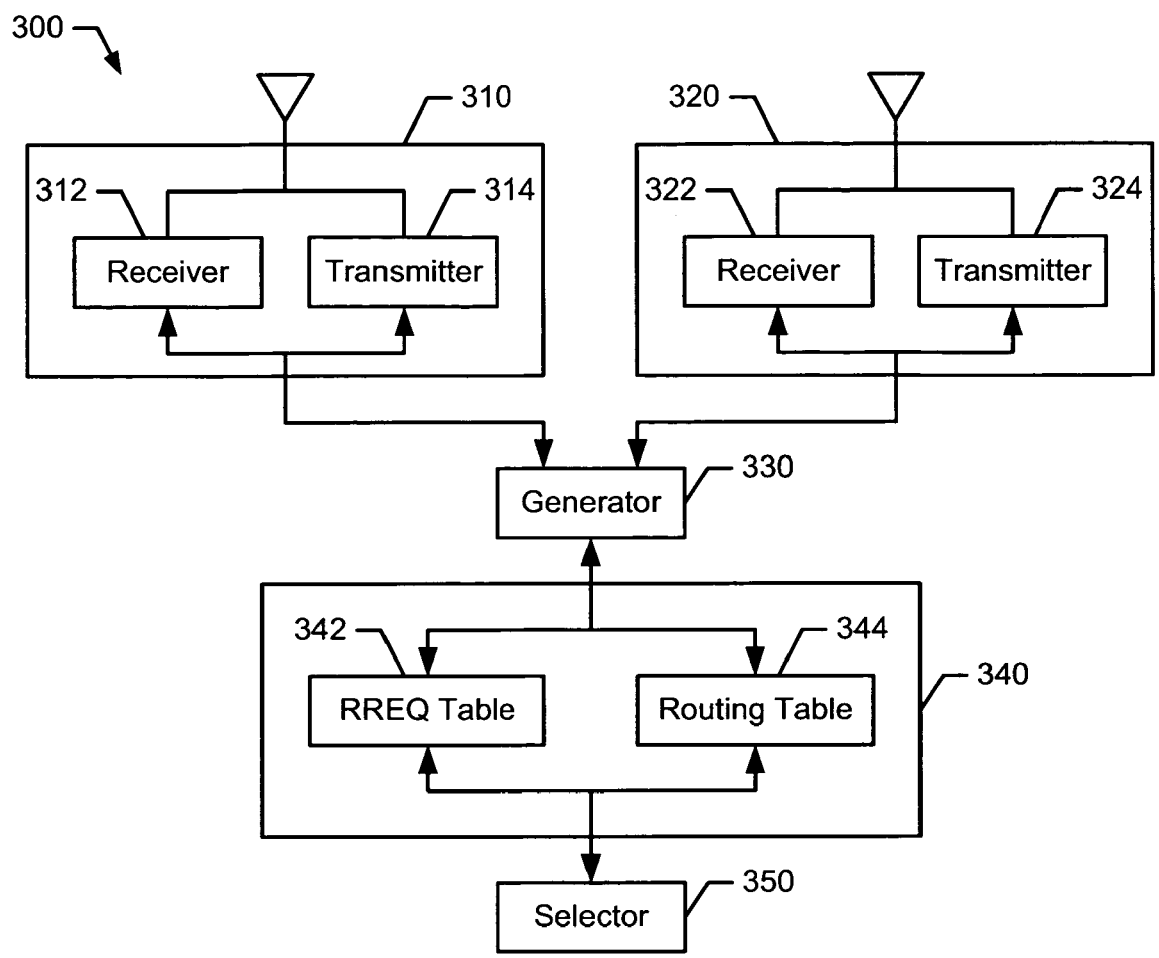
FIG. 3 is a block diagram representation of an example mesh node associated with the example wireless communication systems of FIGS. 1 and 2.

Turning to FIG. 3, an example mesh node 300 may include a first communication interface 310, a second communication interface 320, a generator 330, a memory 340, and a selector 350. Each of the first and second communication interfaces 310 and 320 may include a receiver, generally shown as 312 and 322, and a transmitter, generally shown as 314 and 324. Further, each of the first and second communication interfaces 310 and 320 may communicate on one or more of a plurality of communication channels of a wireless mesh network (e.g., the wireless mesh network 100 of FIG. 1). For example, the mesh node 300 may use the first communication interface 310 to communicate with other mesh nodes and/or communication networks via a first communication channel (e.g., Channel 1) and the second communication interface 320 to communicate with other mesh nodes and/or communication networks via a second communication channel (e.g., Channel 2). Although FIG. 3 depicts two communication interfaces, the mesh node 300 may include additional communication interfaces.

The first and second communication interfaces 310 and 320 may be coupled to the generator 330. The generator 330 may be configured to generate a matrix having metric information associated with the plurality of communication channels of the wireless mesh network (e.g., the matrices 400, 500, and 600 of FIGS. 4, 5, and 6, respectively). As described in detail below, the matrix may provide metric information of each communication channel operating as a bottleneck channel. As described in detail below, a bottleneck channel may be a communication channel that may be used minimally by mesh nodes along a path to achieve optimal results.

The generator 330 may be operatively coupled to the memory 340. The memory 340 may include a route request table 342 (e.g., the route request table 700 of FIG. 7) and a routing table 344 (e.g., the routing table 800 of FIG. 8). In particular, the route request table 342 may provide route request information indicative of metric information associated with the plurality of communication channels of the wireless mesh network. Based on the route request table, the routing table 344 may provide routing information associated with the wireless mesh network.

While the components shown in FIG. 3 are depicted as separate blocks within the mesh node 300, the functions performed by some of these blocks may be integrated within a single semiconductor circuit or may be implemented using two or more separate integrated circuits. For example, although the receiver 312 and the transmitter 322 are depicted as separate blocks within the first communication interface 310, the receiver 312 may be integrated into the transmitter 322 or vice versa (e.g., a transceiver). In a similar manner, the receiver 314 and the transmitter 324 may be integrated into a single component. The methods and apparatus described herein are not limited in this regard.

To identify an optimal path between a source node and a destination node of an end-to-end route in a wireless mesh network, each mesh node may generate a matrix having metric information associated with a plurality of communication channels, generate and/or update route request information, and provide the route request information to other mesh nodes of the wireless mesh network. In particular, the matrix may indicate the metrics of each communication channel on a path from the source node to the destination node based on each communication channel operating as a bottleneck channel.

Figure 4:
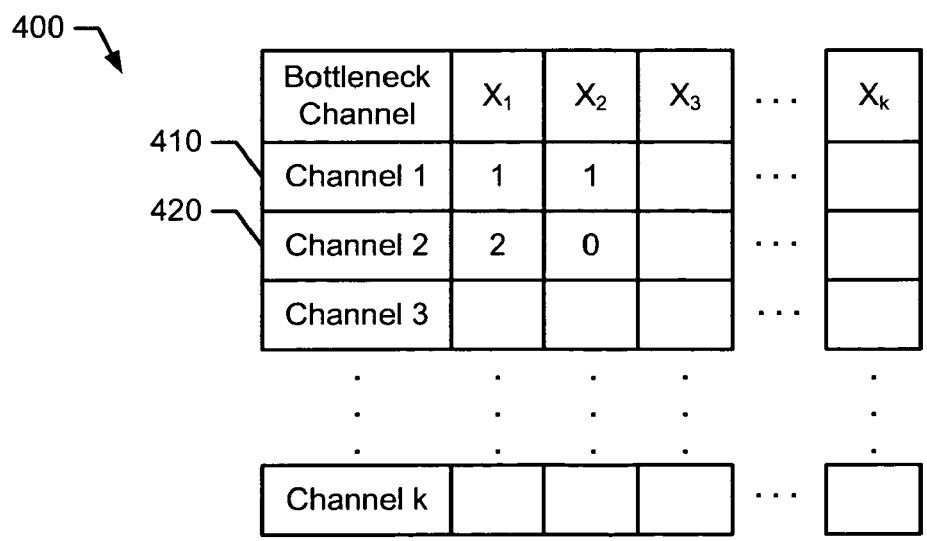
FIG. 4 depicts an example matrix that may be used to describe an example path in the example wireless communication system of FIG. 2.

Referring to FIG. 4, for example, the intermediate node 204 of FIG. 2 may generate a matrix 400. The matrix 400 may include two or more bottleneck channel rows, generally shown as 410 and 420. Each of the rows 410 and 420 may provide metric information associated with one of the plurality of communication channels operating as the bottleneck channel from the intermediate node 204 to the source node 201 in the wireless mesh network 200 between the source node 201 and the destination node 206. Each of the rows 410 and 420 may contain a metric representing the cost associated with a path that minimizes the impact of a particular bottleneck channel. For example, the bottleneck channel may be a communication channel used by most mesh nodes of a path in the wireless mesh network 200.

As indicated in FIG. 2, the node 204 may communicate with the source node 201 via a first path including the link 210 between the source node 201 and the intermediate node 202 operating on Channel 1 (e.g., indicated by a dashed line), and the link 230 between the intermediate nodes 202 and 204 operating on Channel 1 (e.g., also indicated by a dashed line). Alternatively, the node 204 may communicate with the source node 201 via a second path including the link 220 between the source node 201 and the intermediate node 204 operating on Channel 1 (e.g., indicated by a dashed line), and the link 240 between the intermediate nodes 203 and 204 operating on Channel 2 (e.g., indicated by a solid line).

In one example, the bottleneck channel row 410 may correspond to Channel 1 operating as the bottleneck channel of a path between the source node 201 and the intermediate node 204. Thus, an optimal path between the source node 201 and the intermediate node 204 may be a path including the least number of mesh links operating on Channel 1. Accordingly, the optimal path between the source node 201 and the intermediate node 204 with Channel 1 operating as the bottleneck channel may be a path through the intermediate node 203 including the links 220 and 240. As indicated by $X_1$ of the bottleneck channel row 410, the path through the intermediate node 203 may include a metric value of one to indicate the metric of the link 220 operating on Channel 1. As indicated by $X_2$ of the bottleneck channel row 410, the path through the intermediate node 203 may include a metric value of one to indicate the metric of the link 240 operating on Channel 2.

While the methods and apparatus disclosed herein are described with each link having metric value of one, the methods and apparatus disclosed herein may be readily applicable to other metric values. Further, the metric values disclosed herein may represent link characteristics such as available capacity, delay and/or other suitable characteristics.

In another example, the bottleneck channel row 420 may correspond to Channel 2 operating as the bottleneck channel of a path between the source node 201 and the intermediate node 204. Thus, an optimal path between the source node 201 and the intermediate node 204 may be a path including the least number of mesh links operating on Channel 2. Accordingly, the optimal path between the source node 201 and the intermediate node 204 with Channel 2 operating as the bottleneck channel may be a path through the intermediate node 202 including the links 210 and 230. As indicated by $X_1$ of the bottleneck channel row 420, the path through the intermediate node 202 may include a metric value of two to indicate the metric of the links 210 and 230 operating on Channel 1. Along the path between the source node 201 and the intermediate node 204 through the intermediate node 202, none of the links (e.g., the links 210 and 230) operate on Channel 2. Thus, $X_2$ of the bottleneck channel row 420 may be zero to indicate that neither the link 210 nor the link 230 operates on Channel 2.

Figure 5:
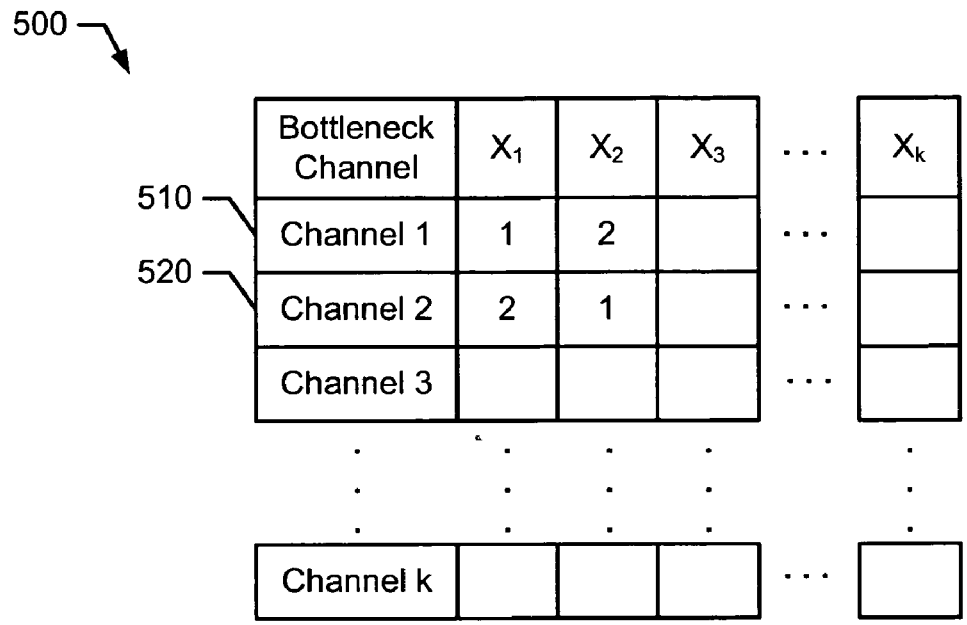
FIG. 5 depicts another example matrix that may be used to describe another example path in the example wireless communication system of FIG. 2.

An optimal path may be determined by a function of the vector of $X_i$ values representing that particular path. In one example, an optimal path may be a path that minimizes the value of MAX $(X_i)$. Further, an optimal path between a source node and an intermediate node of an end-to-end route may not necessarily be the optimal path between the source node and another intermediate node of the wireless mesh network 200. For example, an optimal path between the source node 201 and the intermediate node 204 may not necessarily be an optimal path between the source node 201 and the intermediate node 205. Thus, the intermediate node 204 may transmit the matrix 400 in a route request message to the intermediate node 205, which in turn, may update the matrix 400 to generate the matrix 500 as shown in FIG. 5. The matrix 500 may include two or more bottleneck channel rows, generally shown as 510 and 520. Each of the rows 510 and 520 may provide metric information associated with one of the plurality of communication channels operating as the bottleneck channel from the intermediate node 205 to the source node 201 in the wireless mesh network 200 between the source node 201 and the destination node 206.

As indicated in FIG. 2, the intermediate node 205 may communicate with the source node 201 via a first path including the link 210 between the source node 201 and the intermediate node 202 operating on Channel 1, the link 230 between the intermediate nodes 202 and 204 operating on Channel 1, and the link 250 between the intermediate nodes 204 and 205 operating on Channel 2. Alternatively, the intermediate node 205 may communicate with the source node 201 via a second path including the link 220 between the source node 201 and the intermediate node 203 operating on Channel 1, the link 240 between the intermediate nodes 203 and 204 operating on Channel 2, and the link 230 between the intermediate nodes 204 and 205 operating on Channel 2.

In one example, the bottleneck channel row 510 may correspond to Channel 1 operating as the bottleneck channel in a path between the source node 201 and the intermediate node 205. Thus, an optimal path between the source node 201 and the intermediate node 205 may be a path including the least number of mesh links operating on Channel 1. Accordingly, the optimal path between the source node 201 and the intermediate node 205 with Channel 1 operating as the bottleneck channel may be a path through the intermediate nodes 203 and 204 including the links 220, 240, and 250. As indicated by $X_1$ of the bottleneck channel row 510, the path through the intermediate nodes 203 and 204 may include a metric value of one to indicate the metric of the link 220 operating on Channel 1. As indicated by $X_2$ of the bottleneck channel row 510, the path through the intermediate nodes 203 and 204 may include a metric value of two to indicate the metric of the links 240 and 250 operating on Channel 2.

In another example, the bottleneck channel row 520 may correspond to Channel 2 operating as the bottleneck channel of a path between the source node 201 and the intermediate node 205. Thus, an optimal path between the source node 201 and the intermediate node 205 may be a path including the least number of mesh links operating on Channel 2. Accordingly, the optimal path between the source node 201 and the intermediate node 205 with Channel 2 operating as the bottleneck channel may be a path through the intermediate nodes 202 and 204 including the links 210, 230, and 250. As indicated by $X_1$ of the bottleneck channel row 520, the path through the intermediate nodes 202 and 204 may include a metric value of two to indicate the metric of the links 210 and 230 operating on Channel 1. As indicated by $X_2$ of the bottleneck channel row 520, the path through the intermediate nodes 202 and 204 may include a metric value of one to indicate the metric of the link 250 operating on Channel 2.

Figure 6:
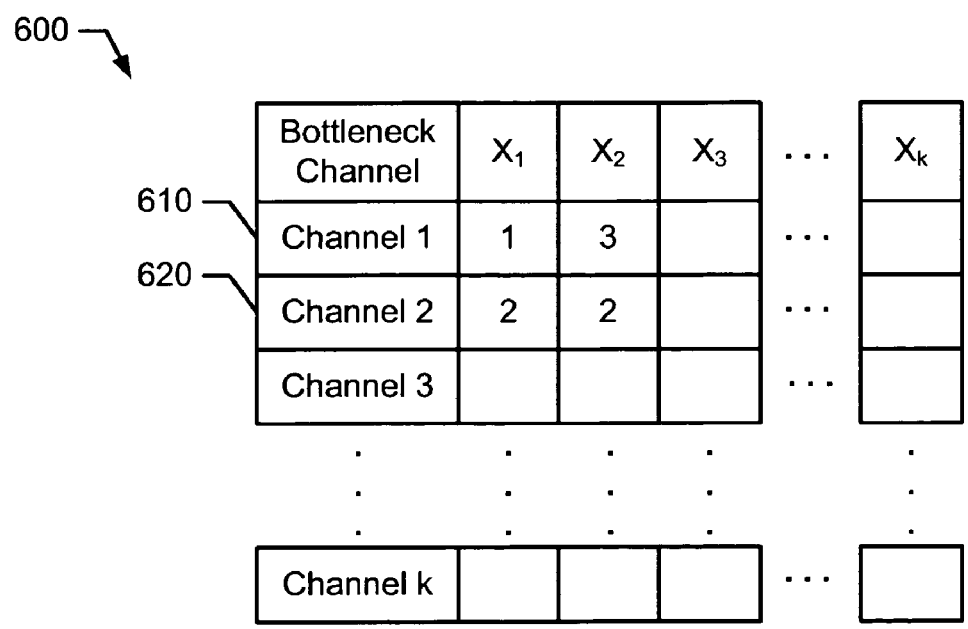
FIG. 6 depicts yet another example matrix that may be used to describe yet another example path in the example wireless communication system of FIG. 2.

An optimal path between a source node and an intermediate node may not necessarily be an optimal path between the source node and a destination node of an end-to-end route. For example, an optimal path between the source node 201 and the intermediate node 205 may not necessarily be an optimal path between the source node 201 and the destination node 206. Thus, the intermediate node 205 may transmit the matrix 500 in a route request message to the destination node 206, which in turn, may update the matrix 500 to generate the matrix 600 as shown in FIG. 6. The matrix 600 may include two or more bottleneck channel rows, generally shown 610 and 620. Each of the rows 610 and 620 may provide metric information associated with one of the plurality of communication channels operating as the bottleneck channel from the destination node 206 to the source node 201 in the wireless mesh network 200.

As indicated in FIG. 2, the destination node 206 may communicate with the source node 201 via a first path including the link 210 between the source node 201 and the intermediate node 202 operating on Channel 1, the link 230 between the intermediate nodes 202 and 204 operating on Channel 1, the link 250 between the intermediate nodes 204 and 205 operating on Channel 2, and the link 260 between the intermediate node 205 and the destination node 206 operating on Channel 2. Alternatively, the destination node 206 may communicate with the source node 201 via a second path including the link 220 between the source node 201 and the intermediate node 203 operating on Channel 1, the link 240 between the intermediate nodes 203 and 204 operating on Channel 2, the link 250 between the intermediate nodes 204 and 205 operating on Channel 2, and the link 260 between the intermediate node 205 and the destination node 206 operating on Channel 2.

In one example, the bottleneck channel row 610 may correspond to Channel 1 operating as the bottleneck channel of a path between the source node 201 and the destination node 206. Thus, an optimal path between the source node 201 and the destination node 206 may be a path including the least number of mesh links operating on Channel 1. Accordingly, the optimal path between the source node 201 and the destination node 206 with Channel 1 operating as the bottleneck channel may be a path through the intermediate nodes 203, 204, and 205 including the links 220, 240, 250, and 260. As indicated by $X_1$ of the bottleneck channel row 610, the path through the intermediate nodes 203, 204, and 205 may include a metric value of one to indicate the metric of the link 220 operating on Channel 1. As indicated by $X_2$ of the bottleneck channel row 610, the path through the intermediate nodes 203, 204, and 205 may include a metric value of three to indicate the metric of the links 240, 250, and 260 operating on Channel 2.

In another example, the bottleneck channel row 620 may correspond to Channel 2 operating as the bottleneck channel of a path between the source node 201 and the destination node 206. Thus, an optimal path between the source node 201 and the destination node 206 may be a path including the least number of mesh links operating on Channel 2. Accordingly, the optimal path between the source node 201 and the destination node 206 with Channel 2 operating as the bottleneck channel may be a path through the intermediate nodes 202, 204, and 205 including the links 210, 230, 250, and 260. As indicated by $X_1$ of the bottleneck channel row 620, the path through the intermediate nodes 202, 204, and 205 may include a metric value of two to indicate the metric of the links 210 and 230 operating on Channel 1. As indicated by $X_2$ in the bottleneck channel row 620, the path through the intermediate nodes 202, 204, and 205 may include a metric value of two to indicate the metric of the links 250 and 260 operating on Channel 2. Thus, the destination node 206 may select an optimal end-to-end route between the source node 201 and the destination node 206 based on the matrix 600.

Referring back to FIG. 3, the mesh node 300 may generate and/or update the route request table 342 based on a matrix having metric information associated with a plurality of communication channels of a wireless mesh network (e.g., the wireless mesh network 100 of FIG. 1). Based on the matrix 400, for example, the intermediate node 204 may generate and/or update a corresponding route request table that may be stored locally at the intermediate node 204 (e.g., the route request table 700 in FIG. 7). For example, the source node 201 may initiate a route request message to the intermediate nodes 202 and 203. Accordingly, the intermediate node 204 may receive route request messages from the intermediate nodes 202 and 203 to generate the corresponding route request table.

Turning to FIG. 7, an example route request table 700 of the intermediate node 204 may include two or more route request entries, generally shown as 710 and 720. Each of the route request entries 710 and 720 may provide route request information associated with each of the plurality of communication channels of the wireless mesh network based on the matrix 400. In particular, each route request entry may include information indicative of a channel used by the intermediate node 204, a next-hop node from the intermediate node 204, and metric information associated with the bottleneck channel.

In one example, the route request entry 710 may provide route request information corresponding to Channel 1 operating as the bottleneck channel of a path between the source node 201 and the intermediate node 204. The route request entry 710 may include information indicative of Channel 2 being the communication channel used by the intermediate node 204 to communicate with the next-hop node, which may be the intermediate node 203. Further, the route request entry 710 may include information indicative of the metric values of Channels 1 and 2, with Channel 1 operating as the bottleneck channel.

In another example, the route request entry 720 may provide route request information corresponding to Channel 2 operating as the bottleneck channel of a path between the source node 201 and the intermediate node 204. The route request entry 720 may include information indicative of Channel 1 being the communication channel used by the intermediate node 204 to communicate with the next-hop node, which may be the intermediate node 202. Further, the route request entry 720 may include information indicative of the metric values of Channels 1 and 2, with Channel 2 operating as the bottleneck channel.

If the mesh node 300 receives a route request message from a source node, the mesh node 300 may generate the route request table 342. In one example, the intermediate node 202 may generate a corresponding route request table locally stored at the intermediate node 202 in response to receipt of a route request message from the source node 201 of the wireless mesh network 200. In another example, the intermediate node 203 may also generate a corresponding route request table locally stored at the intermediate node 203 in response to receipt of a route request message from the source node 201 of the wireless mesh network 200.

Alternatively, if the mesh node 300 previously generated the route request table 342, the mesh node 300 may update the route request table 342 based on a route request identifier of the route request message (e.g., a sequence number). For example, if the sequence number of the route request message is greater than the sequence number of the route request table 700, the intermediate node 204 may update the route request table 700 with the metric information associated with the plurality of communication channels of the route request message. If the sequence number of the route request message is less than to the sequence number of the route request table 700, the intermediate node 204 may disregard the metric information associated with the plurality of communication channels of the route request message. If the sequence number of the route request message is equal to the sequence number of the route request table 700, the intermediate node 204 may compare the metric information of the route request message and the metric information of the route request table 700. For example, the metric values of the route request message for the route request entry 710 may be better than the metric values of the route request table 700 for the route request entry 710. Accordingly, the intermediate node 204 may substitute the metric values of the route request table 700 for the route request entry 710 with the metric values of the route request message for the route request entry 710. In particular, the intermediate node 204 may first minimize the value of $X_1$ for the route request entry 710. Then, the intermediate node 204 may minimize the overall metric based MAX $(X_i)$, SUM $(X_i)$, and/or other suitable functions. In a similar manner, the intermediate node 204 may first minimize the value of $X_2$ for the route request entry 720 and then minimize the overall metric.

Turning back to FIG. 3, the mesh node 300 may also generate the routing table 344 to identify an optimal path from a source node to a destination node. In one example, the routing table 800 may be generated during a route request/route response cycle between the source node 201 and the destination node 206. The mesh node 204 may generate a routing table 800 of FIG. 8 based on the route request table 700 (FIG. 7).

The routing table 800 may include one or more routing entries, generally shown as 810, 820, and 830, to provide routing information associated with the end-to-end route of the mesh nodes in the wireless mesh network 200. Each routing entry may indicate a source node, a destination node, and a next-hop node. For example, the routing entry 810 may indicate that a packet from the mesh node 201 to the mesh node 206 may be routed through the mesh node 205. The routing entry 810 may be generated when the mesh node 204 received the route response from the mesh node 205.

The routing table 800 may also provide routing information indicative of one of the plurality of communication channels operating as a bottleneck channel. In one example, the routing entry 820 may provide routing information corresponding to Channel 1 operating as the bottleneck channel of the end-to-end route of the mesh nodes in wireless mesh network 200. The routing entry 820 may be generated when the mesh node 204 received the route request from the source node 201. Based on the route request table 700 of FIG. 7, the routing entry 820 may indicate that a packet from the mesh node 204 to the source node 201 may be routed through the mesh node 203. The mesh node 204 may select Channel 1 to operate as the bottleneck channel to reach the source node 201 because the metric associated with Channel 1 may minimize the maximum metric values in any column of the route request table 700. Thus, the mesh node 203 may be next hop to reach the source node 201 from the mesh node 204.

The routing entry 830 may be generated when the mesh node 204 received the route response from the destination node 206, which may indicate that Channel 2 is operating as the bottleneck channel for a path from the source node 201 to the destination node 206 based on a corresponding route request table of the destination node 206. Based on the entry 720 of the route request table 700, the routing entry 830 may indicate that a packet from the mesh node 206 to the mesh node 201 may be routed through the mesh node 202 instead of the mesh node 203. Thus, an optimal path for a packet from the mesh node 204 to the source node 201 of the wireless mesh network 200 may be through the mesh node 203 while an optimal path for a packet from the mesh node 206 to the source node 201 of the wireless mesh network 200 may be through the mesh node 202.

Although some of the above examples may be described with respect to the intermediate node 204, each of the other mesh nodes 201, 202, 203, 205, and 206 may also generate and/or update a corresponding route request table and/or a corresponding routing table in a similar manner as described herein. Each of the other mesh nodes 201, 202, 203, 205, and 206 may store the corresponding route request table and the corresponding routing table in a local memory.

Figure 9:
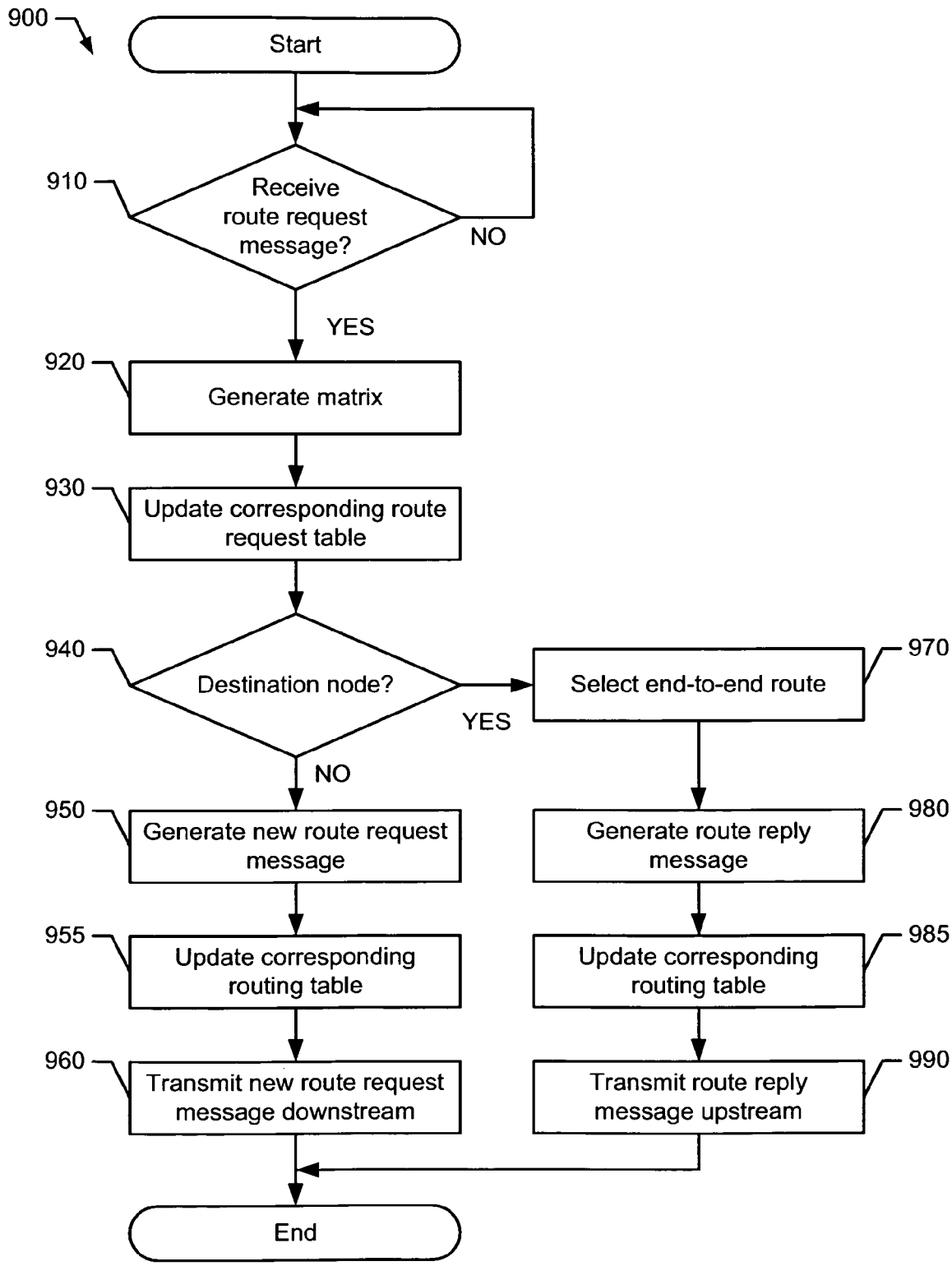
FIG. 9 is a flow diagram representation of one manner in which the example mesh node of FIG. 3 may be configured to identify a distance-vector route.

FIG. 9 depicts one manner in which the example mesh node of FIG. 3 may be configured to identify a distance-vector route associated with the wireless mesh network. The example process 900 of FIG. 9 may be implemented as machine-accessible instructions utilizing any of many different programming codes stored on any combination of machine-accessible media such as a volatile or nonvolatile memory or other mass storage device (e.g., a floppy disk, a CD, and a DVD). For example, the machine-accessible instructions may be embodied in a machine-accessible medium such as a programmable gate array, an application specific integrated circuit (ASIC), an erasable programmable read only memory (EPROM), a read only memory (ROM), a random access memory (RAM), a magnetic media, an optical media, and/or any other suitable type of medium.

Further, although a particular order of actions is illustrated in FIG. 9, these actions can be performed in other temporal sequences. Again, the example process 900 is merely provided and described in conjunction with the apparatus of FIGS. 2 and 3 as an example of one way to configure a mesh node to identify a distance-vector route associated with a wireless mesh network.

In the example of FIG. 9, the process 900 may begin with the mesh node 300 monitoring for a route request message (block 910). If the mesh node 300 fails to receive a route request message, the mesh node 300 may continue to monitor for a route request message. If the mesh node 300 receives a route request message, the mesh node 300 may generate a matrix having metric information associated with a plurality of communication channels of a wireless mesh network (e.g., the matrices of 400, 500, and 600 of FIGS. 4, 5, and 6, respectively) (block 920). For example, the mesh node 300 may decode the matrix included in the route request message. The mesh node 300 may add the metric value corresponding to an incoming link in the column corresponding to the communication channel of that particular link. Accordingly, the mesh node 300 may generate a corresponding matrix having updated metric information.

Based on the route request message, the mesh node 300 may generate or update a corresponding route request table 342 that may be locally stored at the mesh node 300 (block 930). As noted above, the route request table 342 may include two or more route request entries with each route request entry corresponding to one of the plurality of communication channels operating as a bottleneck channel. Each route request entry may include information indicative of a channel used by the mesh node 300, a next-hop node along a path from the mesh node 300, and metric information associated with the plurality of communication channels. Further, each of the route request entry may be updated independently.

As noted above, for example, each row in the route request table 700 may be compared to the same row in the matrix 400. The best row may be selected and inserted into the route request table 700. In particular, the mesh node 300 may select a row to minimize the value in the column corresponding to the bottleneck channel associated with that particular row. Then, the mesh node 300 may select a row to minimize the overall metric based on MAX $(X_i)$, SUM $(X_i)$ and/or other suitable functions.

The mesh node 300 may determine whether the mesh node 300 is the destination node of an end-to-end route (block 940). If the mesh node 300 is not the destination node of the end-to-end route, the mesh node 300 may generate a new route request message (block 950). In the wireless mesh network 200 of FIG. 2, for example, the mesh node 204 may be an intermediate node instead of a destination node. The mesh node 300 may also update a corresponding routing table 344 that may be locally stored at the mesh node 300 (block 955). As described above, the routing table 344 may include information indicative of a next-hop node of a path from the mesh node 300. Based on the routing table 344, the mesh node 300 may transmit the new route request message downstream toward the destination node of the end-to-end route (block 960). Following the example above, the mesh node 204 may transmit the new route request message to the mesh node 205. Accordingly, the mesh node 205 may process the new route request message in a similar manner as described herein in connection with the process 900.

Referring back to block 940, if the mesh node 300 is the destination node of the end-to-end route, the mesh node 300 may select an optimal path for the end-to-end route (block 970). In one example, the mesh node 206 may be the destination node of the end-to-end route. Based on the route request information, the destination node 206 may select a path through the intermediate nodes 202, 204, and 205 as an optimal path for the end-to-end route between the source node 201 and the destination node 206 instead of a path through the intermediate nodes 203, 204, and 205. Accordingly, the destination node 206 may select the bottleneck channel row 620 from the matrix 600.

To inform other mesh nodes of an optimal path selected between a source node and a destination node, the mesh node 300 may generate a route reply message (block 980). The route reply message may include information indicative of the source node, the destination node, and the selected bottleneck channel row from a matrix generated by the destination node. For example, the destination node 206 may identify an optimal path for the end-to-end route by selecting a bottleneck channel row that minimizes the maximum value of $X_i$ corresponding to that bottleneck channel row (e.g., the bottleneck channel row 620 with Channel 2 operating as the bottleneck channel). Further, the mesh node 300 may update a corresponding routing table with a routing entry indicating the next-hop node of an optimal path to the source node (block 985). In particular, the next-hop node of the routing entry may be the next-hop node of a route request entry corresponding to the selected bottleneck channel row. For example, the route request entry 720 may correspond to the bottleneck channel row 620 of the matrix 600 selected by the destination node 206. The route request entry 720 may indicate that the next-hop node is the intermediate node 202. Thus, the routing entry 830 may indicate that the next-hop node for the intermediate node 204 of the end-to-end route between the source node 201 and the destination node 206 is the intermediate node 202. Accordingly, the mesh node 300 may transmit the route response message upstream toward the source node of the end-to-end route (block 990). That is, the destination node may transmit the route reply message to the next-hop node along the optimal path of the end-to-end route to the source node.

Following the above example, the destination node 206 may transmit a route reply message to the intermediate node 205 because the intermediate node 205 may be the next-hop node along the optimal path of the end-to-end route to the source node 201 as indicated in the route request table 700. In a similar manner, the intermediate node 205 may forward the route reply message to the intermediate node 204, which in turn, may forward the route reply message to the intermediate node 202. The intermediate node 202 may forward the route reply message to the source node 201. Accordingly, the source node 201 may update a corresponding routing table based on the information of the route reply message. As a result, the source node 201 and the destination node 206 may communicate with each other via an optimal path of the end-to-end route.

Although the methods and apparatus disclosed herein are described with respect to distance vector protocols based on a hop-by-hop routing table such as a destination-sequenced distance vector (DSDV) protocol and/or an ad-hoc on-demand distance vector (AODV) protocol to select routes in a wireless mesh network having a plurality of channels, the methods and apparatus disclosed herein may be readily applicable to other distance vector protocols. For example, the methods and apparatus disclosed herein may implement a dynamic source routing (DSR) protocol.

Further, while the methods and apparatus disclosed herein are described with respect to wireless mesh networks, the methods and apparatus disclosed herein may be readily applicable to many other types of communication networks. For example, the methods and apparatus disclosed herein may be used to implement wireless personal area networks (WPANs), wireless local area networks (WLANs), wireless metropolitan area networks (WMANs), and/or wireless wide area networks (WWANs).

Figure 10:
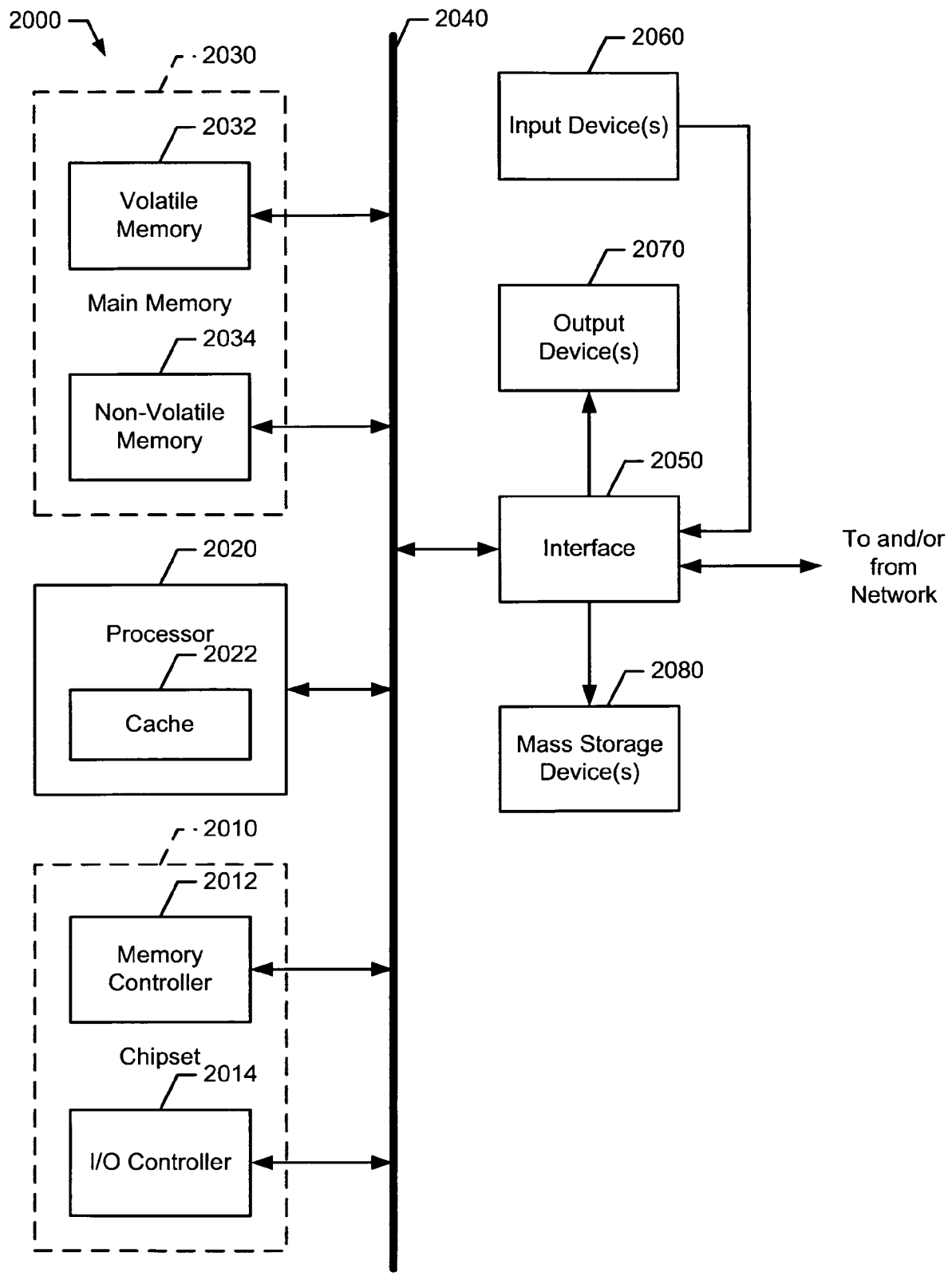
FIG. 10 is a block diagram representation of an example processor system that may be used to implement the example mesh node of FIG. 3.

FIG. 10 is a block diagram of an example processor system 2000 adapted to implement the methods and apparatus disclosed herein. The processor system 2000 may be a desktop computer, a laptop computer, a handheld computer, a tablet computer, a PDA, a server, an Internet appliance, and/or any other type of computing device.

The processor system 2000 illustrated in FIG. 10 includes a chipset 2010, which includes a memory controller 2012 and an input/output (I/O) controller 2014. The chipset 2010 may provide memory and I/O management functions as well as a plurality of general purpose and/or special purpose registers, timers, etc. that are accessible or used by a processor 2020. The processor 2020 may be implemented using one or more processors, WLAN components, WMAN components, WWAN components, and/or other suitable processing components. For example, the processor 2020 may be implemented using one or more of the Intel® Pentium® technology, the Intel® Itanium® technology, the Intel® Centrino™ technology, the Intel® Xeon™ technology, and/or the Intel® XScale® technology. In the alternative, other processing technology may be used to implement the processor 2020. The processor 2020 may include a cache 2022, which may be implemented using a first-level unified cache (L1), a secondlevel unified cache (L2), a third-level unified cache (L3), and/or any other suitable structures to store data.

The memory controller 2012 may perform functions that enable the processor 2020 to access and communicate with a main memory 2030 including a volatile memory 2032 and a non-volatile memory 2034 via a bus 2040. The volatile memory 2032 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 2034 may be implemented using flash memory, Read Only Memory (ROM), Electrically Erasable Programmable Read Only Memory (EEPROM), and/or any other desired type of memory device.

The processor system 2000 may also include an interface circuit 2050 that is coupled to the bus 2040. The interface circuit 2050 may be implemented using any type of interface standard such as an Ethernet interface, a universal serial bus (USB), a third generation input/output interface (3GIO) interface, and/or any other suitable type of interface.

One or more input devices 2060 may be connected to the interface circuit 2050. The input device(s) 2060 permit an individual to enter data and commands into the processor 2020. For example, the input device(s) 2060 may be implemented by a keyboard, a mouse, a touch-sensitive display, a track pad, a track ball, and/or a voice recognition system.

One or more output devices 2070 may also be connected to the interface circuit 2050. For example, the output device(s) 2070 may be implemented by display devices (e.g., a light emitting display (LED), a liquid crystal display (LCD), a cathode ray tube (CRT) display, a printer and/or speakers). The interface circuit 2050 may include, among other things, a graphics driver card.

The processor system 2000 may also include one or more mass storage devices 2080 to store software and data. Examples of such mass storage device(s) 2080 include floppy disks and drives, hard disk drives, compact disks and drives, and digital versatile disks (DVD) and drives.

The interface circuit 2050 may also include a communication device such as a modem or a network interface card to facilitate exchange of data with external computers via a network. The communication link between the processor system 2000 and the network may be any type of network connection such as an Ethernet connection, a digital subscriber line (DSL), a telephone line, a cellular telephone system, a coaxial cable, etc.

Access to the input device(s) 2060, the output device(s) 2070, the mass storage device(s) 2080 and/or the network may be controlled by the I/O controller 2014. In particular, the I/O controller 2014 may perform functions that enable the processor 2020 to communicate with the input device(s) 2060, the output device(s) 2070, the mass storage device(s) 2080 and/or the network via the bus 2040 and the interface circuit 2050.

While the components shown in FIG. 10 are depicted as separate blocks within the processor system 2000, the functions performed by some of these blocks may be integrated within a single semiconductor circuit or may be implemented using two or more separate integrated circuits. For example, although the memory controller 2012 and the I/O controller 2014 are depicted as separate blocks within the chipset 2010, the memory controller 2012 and the I/O controller 2014 may be integrated within a single semiconductor circuit.

Although certain example methods, apparatus, and articles of manufacture have been described herein, the scope of coverage of this disclosure is not limited thereto. On the contrary, this disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware.

What is claimed is:

1. A method for selecting a routing path in a communication network, wherein the communication network includes a plurality of serial communication links, wherein each of the plurality of serial communication links use either a first communication channel or a second communication channel, the method comprising:

determining, at a receiving wireless mesh node, a first desired path to use if the first communication channel is operating as a bottleneck channel, the first desired path including a first plurality of serial communication links between a plurality of adjacent nodes that include a source wireless mesh node, one or more intermediate wireless mesh nodes, and the receiving wireless mesh node, wherein at least one of the first plurality of serial communication links in the first desired path use the first communication channel and at least another of the first plurality of serial communication links in the first desired path use the second communication channel;

determining, at the receiving wireless mesh node, a second desired path to use if the second communication channel is operating as the bottleneck channel, the second desired path including a second plurality of serial communication links between another plurality of adjacent nodes that include the source wireless mesh node, at least one intermediate wireless mesh node, and the receiving wireless mesh node, wherein at least one of the second plurality of serial communication links in the second desired path use the first communication channel and at least another of the second plurality of serial communication links in the second desired path use the second communication channel;

generating, at the receiving wireless mesh node, a matrix of metric information to provide an indication of a number of the first plurality of serial communication links of the first desired path that use the first communication channel when the first communication channel is operating as a bottleneck channel and to further provide an indication of a number of the second plurality of serial communication links of the second desired path that use the second communication channel when the second communication channel is operating as a bottleneck channel.

2. A method as defined in claim 1, wherein generating the matrix at the receiving wireless mesh node comprises updating the matrix in response to receipt of a route request message from one or more intermediate nodes.

3. A method as defined in claim 1, further comprising selecting an end-to-end route to the source node based on route request information at the receiving wireless mesh node, and wherein the receiving wireless mesh node is a destination node of the end-to-end route.

4. A method as defined in claim 1, further comprising:
providing, by the receiving wireless mesh node, route request information based on the matrix to a second receiving wireless mesh node of the plurality of mesh nodes.

5. A method as defined in claim 4, wherein providing the route request information based on the matrix to the second receiving wireless mesh node comprises generating a route request table associated with the receiving wireless mesh node.

6. A method as defined in claim 4, wherein providing the route request information comprises generating a route request message having the route request information at the receiving wireless mesh node, wherein the receiving wireless mesh node is an intermediate node of an end-to-end route.

7. A method as defined in claim 4, wherein providing the route request information comprises generating a route reply message having the route request information at the receiving wireless mesh node, wherein the receiving wireless mesh node is a destination node of an end-to-end route.

8. A method as defined in claim 4, further comprising generating routing information based on the route request information at the receiving wireless mesh node.

9. A method as defined in claim 4, further comprising transmitting one of a route request message having the route request information to an intermediate node of an end-to-end route or a route reply message having the route request information to the source node of the end-to-end route.

10. A method as defined in claim 1, further comprising:
selecting a routing path, based at least in part on the generated matrix, for communication between the source wireless mesh node and the receiving wireless mesh node, that includes a plurality of links that use the first and/or the second communication channel.

11. An article of manufacture including a computer-readable storage medium, and instructions stored in the storage medium, configured to enable a machine to select a routing path in a communication network, wherein the communication network includes a plurality of serial communication links, wherein each of the plurality of serial communication links use either a first communication channel or a second communication channel, wherein the instructions are configured to enable machine to select the routing path by enabling the machine to:
determine, at a receiving wireless mesh node, a first desired path to use if the first communication channel is operating as a bottleneck channel, the first desired path including a first plurality of serial communication links between a plurality of adjacent nodes that include a source wireless mesh node, one or more intermediate wireless mesh nodes, and the receiving wireless mesh node, wherein at least one of the first plurality of serial communication links in the first desired path use the first communication channel and at least another of the first plurality of serial communication links in the first desired path use the second communication channel;
determine, at the receiving wireless mesh node, a second desired path to use if the second communication channel is operating as the bottleneck channel, the second desired path including a second plurality of serial communication links between another plurality of adjacent nodes that include the source wireless mesh node, at least one intermediate wireless mesh node, and the receiving wireless mesh node, wherein at least one of the second plurality of serial communication links in the second desired path use the first communication channel and at least another of the second plurality of serial communication links in the second desired path use the second communication channel;
generate, at the receiving wireless mesh node, a matrix of channel metrics to provide an indication of a number of the first plurality of serial communication links of the first desired path that use the first communication channel when the first communication channel is operating as a bottleneck channel and to further provide an indication of a number of the second plurality of serial communication links of the second desired path that use the second communication channel when the second communication channel is operating as a bottleneck channel.

12. An article of manufacture as defined in claim 11, wherein the instructions are further configured to enable the machine to generate the matrix at the receiving wireless mesh node by updating the matrix in response to receipt of a route request message.

13. An article of manufacture as defined in claim 11, wherein the instructions are further configured to enable the machine to provide route request information based on the matrix to a second receiving wireless mesh node of the plurality of mesh nodes.

14. An article of manufacture as defined in claim 13, wherein the instructions are further configured to enable the machine to provide the route request information based on the matrix to the second receiving wireless mesh node by generating a route request table associated with the receiving wireless mesh node.

15. An article of manufacture as defined in claim 13, wherein the instructions are further configured to enable the machine to provide the route request information by generating a route request message having the route request information at the receiving wireless mesh node, and wherein the receiving wireless mesh node is an intermediate node of an end-to-end route.

16. An article of manufacture as defined in claim 13, wherein the instructions are further configured to enable the machine to provide the route request information by generating a route reply message having the route request information at the receiving wireless mesh node, and wherein the receiving wireless mesh node is a destination node of an end-to-end route.

17. An article of manufacture as defined in claim 13, wherein the instructions are further configured to enable the machine to generate routing information based on the route request information at the receiving wireless mesh node.

18. An article of manufacture as defined in claim 13, wherein the instructions are further configured to enable the machine to select an end-to-end route to the source node based on the route request information at the receiving wireless mesh node, and wherein the receiving wireless mesh node is a destination node of the end-to-end route.

19. An apparatus for selecting a routing path in a communication network, wherein the communication network includes a plurality of serial communication links, wherein each of the plurality of serial communication links use either a first communication channel or a second communication channel, the apparatus comprising:
a first communication interface associated with the first communication channel;
a second communication interface associated with the second communication channel; and
a generator coupled to the first and second communication interfaces and configured to:
determine, at a receiving wireless mesh node, a first desired path to use if the first communication channel is operating as a bottleneck channel, the first desired path including a first plurality of serial communication links between a plurality of adjacent nodes that include a source wireless mesh node, one or more intermediate wireless mesh nodes, and the receiving wireless mesh node, wherein at least one of the first plurality of serial communication links in the first desired path use the first communication channel and at least another of the first plurality of serial communication links in the first desired path use the second communication channel;

determine, at the receiving wireless mesh node, a second desired path to use if the second communication channel is operating as the bottleneck channel, the second desired path including a second plurality of serial communication links between another plurality of adjacent nodes that include the source wireless mesh node, at least one intermediate wireless mesh node, and the receiving wireless mesh node, wherein at least one of the second plurality of serial communication links in the second desired path use the first communication channel and at least another of the second plurality of serial communication links in the second desired path use the second communication channel; and generate, at the receiving wireless mesh node, a matrix of metric information to provide an indication of a number of the first plurality of serial communication links of the first desired path that use the first communication channel when the first communication channel is operating as a bottleneck channel and to further provide an indication of a number of the second plurality of serial communication links of the second desired path that use the second communication channel when the second communication channel is operating as a bottleneck channel.

20. An apparatus as defined in claim 19, wherein the generator is further configured to provide, at the receiving wireless mesh node, route request information based on the matrix to a second receiving wireless mesh node of the plurality of mesh nodes.

21. An apparatus as defined in claim 20, wherein the generator is configured to generate a route request message having the route request information at the receiving wireless mesh node, and wherein the receiving wireless mesh node is an intermediate node of an end-to-end route.

22. An apparatus as defined in claim 20, wherein the generator is configured to generate a route reply message having the route request information at the receiving wireless mesh node, and wherein the receiving wireless mesh node is a destination node of an end-to-end route.

23. An apparatus as defined in claim 20, wherein the generator is configured to generate routing information based on the route request information at the receiving wireless mesh node.

24. An apparatus as defined in claim 20 further comprising a selector to select an end-to-end route to the source node based on the route request information at the receiving wireless mesh node, and wherein the receiving wireless mesh node is a destination node of the end-to-end route.

25. A system for selecting a routing path in a communication network that includes a plurality of serial communication links, wherein each of the plurality of serial communication links use either a first communication channel or a second communication channel, the system comprising:

a flash memory; and a processor coupled to the flash memory and configured to:
determine, at a receiving wireless mesh node, a first desired path to use when a first communication channel is operating as a bottleneck channel, the first desired path including a first plurality of serial communication links between a plurality of adjacent nodes that include a source wireless mesh node, one or more intermediate wireless mesh nodes, and the receiving wireless mesh node, wherein at least one of the first plurality of serial communication links in the first desired path use the first communication channel and at least another of the first plurality of serial communication links in the first desired path use the second communication channel;

determine, at the receiving wireless mesh node, a second desired path to use when a second communication channel is operating as the bottleneck channel, the second desired path including a second plurality of serial communication links between another plurality of adjacent nodes that include the source wireless mesh node, at least one intermediate wireless mesh node, and the receiving wireless mesh node, wherein at least one of the second plurality of serial communication links in the second desired path use the first communication channel and at least another of the second plurality of serial communication links in the second desired path use the second communication channel; and generate, at the receiving wireless mesh node, a matrix of metric information to provide an indication of a number of the first plurality of serial communication links of the first desired path that use the first communication channel when the first communication channel is operating as a bottleneck channel and to further provide an indication of a number of the second plurality of serial communication links of the second desired path that use the second communication channel when the second communication channel is operating as a bottleneck channel.

26. A system as defined in claim 25, wherein the processor is configured to update the matrix in response to receipt of a route request message.

27. A system as defined in claim 25, wherein the processor is further configured to provide, at the receiving wireless mesh node, route request information based on the matrix to a second receiving wireless mesh node of the plurality of mesh nodes.

28. A system as defined in claim 27, wherein the processor is configured to generate a route request message having the route request information at the receiving wireless mesh node, and wherein the receiving wireless mesh node is an intermediate node of an end-to-end route.

29. A system as defined in claim 27, wherein the processor is configured to generate a route reply message having the route request information at the receiving wireless mesh node, and wherein the receiving wireless mesh node is a destination node of an end-to-end route.

30. A system as defined in claim 27, wherein the processor is configured to generate routing information based on the route request information at the receiving wireless mesh node.

31. A system as defined in claim 27, wherein the processor is configured to select an end-to-end route to the source node based on the route request information at the receiving wireless mesh node, and wherein the receiving wireless mesh node is a destination node of the end-to-end route.

* * * * *